United States Patent
Moriya et al.

(10) Patent No.: US 7,828,880 B2
(45) Date of Patent: Nov. 9, 2010

(54) GAS COLLECTION METHOD AND APPARATUS THEREFOR

(75) Inventors: Yusuke Moriya, Higashikurume (JP); Toichiro Sasaki, Handa (JP); Tetsuya Yanase, Handa (JP)

(73) Assignee: NGK Insulators, Ltd., Nagoya (JP)

( * ) Notice: Subject to any disclaimer, the term of this patent is extended or adjusted under 35 U.S.C. 154(b) by 1072 days.

(21) Appl. No.: 11/538,191

(22) Filed: Oct. 3, 2006

(65) Prior Publication Data

US 2007/0084344 A1    Apr. 19, 2007

(30) Foreign Application Priority Data

Oct. 17, 2005    (JP) ............................. 2005-301114

(51) Int. Cl.
*B01D 53/14*    (2006.01)
(52) U.S. Cl. .............................. 95/210; 96/296; 96/299
(58) Field of Classification Search ........... 95/210–214; 96/290–299, 326
See application file for complete search history.

(56) References Cited

U.S. PATENT DOCUMENTS

| | | | | |
|---|---|---|---|---|
| 4,117,079 A | * | 9/1978 | Bellows ....................... | 423/223 |
| 4,761,164 A | * | 8/1988 | Pez et al. ........................ | 95/44 |
| 4,961,758 A | * | 10/1990 | Dobitz ........................... | 95/44 |
| 5,281,254 A | * | 1/1994 | Birbara et al. .................. | 95/44 |
| 6,500,397 B1 | | 12/2002 | Yoshida et al. | |
| 6,579,343 B2 | * | 6/2003 | Brennecke et al. ............. | 95/51 |
| 2003/0192428 A1 | * | 10/2003 | Cheng et al. ................... | 95/46 |
| 2007/0214957 A1 | * | 9/2007 | Feron et al. ..................... | 95/46 |

FOREIGN PATENT DOCUMENTS

| | | |
|---|---|---|
| EP | 0 647 462 A1 | 4/1995 |
| JP | 05-301023 A1 | 11/1993 |
| JP | 05-301024 A1 | 11/1993 |
| JP | 07-100334 A1 | 4/1995 |

\* cited by examiner

*Primary Examiner*—Duane Smith
*Assistant Examiner*—Ives Wu
(74) *Attorney, Agent, or Firm*—Burr & Brown

(57) ABSTRACT

A liquid film is formed on the surface of a porous body provided with a hydrophobic layer and hydrophilic layer, by moving thereon an ionic liquid having a selective absorption capacity of specific gas, and the specific gas within the gas to be processed is absorbed into the liquid film by bringing pressurized gas to be processed into contact with the liquid film. The specific gas is, for example, a carbon dioxide gas and the ionic liquid is, for example, an imidazolium salt. The specific gas absorbed into the liquid film is passed through the porous body by the use of a difference in pressure, whereby it is collected on a low pressure side. The specific gas absorbed into this collected liquid is then separated into a gas and a liquid by a separator, and the specific gas is released and collected.

5 Claims, 3 Drawing Sheets

GAS COLLECTION METHOD AND APPARATUS THEREFOR

FIELD OF THE INVENTION

The present invention relates to a gas collection method and an apparatus capable of selectively singling out and collecting specific gases from gas to be processed containing plural kinds of gases. More particularly, the present invention relates to a gas collection method and an apparatus capable of selectively separating and collecting $CO_2$ gas from gas to be processed with the use of an ionic liquid.

BACKGROUND OF THE INVENTION

As technology for selectively separating and collecting gas containing plural kinds of gases or specific gases represented by a $CO_2$ gas, a variety of methods such as, for example, an alkanolamine method, a membrane separation method, and a chemical absorption method have been already made available. Recently, from the viewpoint of preventing global warming, technologies have been developed for collecting and removing $CO_2$ gas effectively from the exhaust gas emitted from facilities such as incinerators, and power plants.

Although the alkanolamine method (see, for example, Japanese Patent Application Laid-Open No. 7-100334) represented by a scrubber is easy to develop on a large scale, and its use has become increasingly widespread, a problem exists insofar as there is a substantial loss of energy in the reproduction of a gas absorption liquid for use, and accordingly the quality of the gas absorption liquid deteriorates to a significant degree. Further, the membrane separation method gives rise to a problem insofar as the membrane is expensive and its rate of gas collection is low. Moreover, the chemical absorption method entails a problem insofar as the absorption member made of a material like ceramics deteriorates easily, and the service life of the absorption member is correspondingly short.

Accordingly, an object of the present invention is to provide a gas collection method and an apparatus that is capable of collecting specific gases from gas to be processed effectively, in a high concentrations with a modest loss of energy, a method and an apparatus that can further be applied widely to a variety of apparatuses ranging from small to large scales.

SUMMARY OF THE INVENTION

The gas collection method of the present invention for achieving the above-mentioned object is a gas collection method for separating and collecting specific gases from gas to be processed containing plural kinds of gases, characterized by a liquid film that is formed on a surface of a porous body in which a hydrophobic layer and a hydrophilic layer are formed by means of moving an ionic liquid thereon that has a selective absorption capacity of specific gases; insofar as the specific gas in the gas to be processed, it is absorbed into the liquid film by bringing pressurized gas to be processed into contact with the liquid film; insofar as the use of the difference in pressure, the specific gas that has been absorbed into the liquid film is passed through the porous body and collected at a low pressure side; and once the liquid film has finished moving along the surface of the porous body, it is collected and the specific gas that has been absorbed into the liquid that has been collected is released.

The gas collection apparatus of the present invention for achieving the above-mentioned object is a gas collection apparatus for separating and collecting specific gas from gas to be processed containing plural kinds of gases, preferably includes: a collection apparatus main body supplied with pressurized gas to be processed; a porous body having a hydrophobic layer and a hydrophilic layer formed on a surface provided in the collection apparatus main body; and an ionic liquid supply means for forming a liquid film thereon by moving along the surface of the porous body an ionic liquid that has a selective absorption capacity of the specific gas.

According to the present invention, the liquid film is formed on the surface of the porous body by moving thereon an ionic liquid that has a selective absorption capacity of the specific gas, and specific gas in the gas to be processed is absorbed into the liquid film by bringing pressurized gas to be processed into contact with the liquid film. The specific gas absorbed into this liquid film is passed through the porous body by use of a difference in pressure and collected on a low pressure side, and once the liquid film has finished moving along the surface of the porous body it is collected, and the specific gas that has been absorbed into the liquid that has been collected is released and then collected. By means of a combination of the liquid film separation method and the physical absorption method the present invention enables the specific gas to be collected from the gas to be processed effectively in high concentrations. Further, because dissolution of the specific gas into the ionic liquid is a physical dissolution rather than a chemical dissolution, heating is not required for reproduction of the ionic liquid that has absorbed the gas. In contrast, because nothing other than releasing the pressure is involved, the degree of loss of energy in the course of reproduction can be confirmed to a modest level. Moreover, the porous body is protected from clogging, and effective gas separation processing becomes possible.

DETAILED DESCRIPTION OF THE INVENTION

Hereinafter, the preferred embodiment of the present invention will be described with reference to the accompanying drawings.

Figure 1:
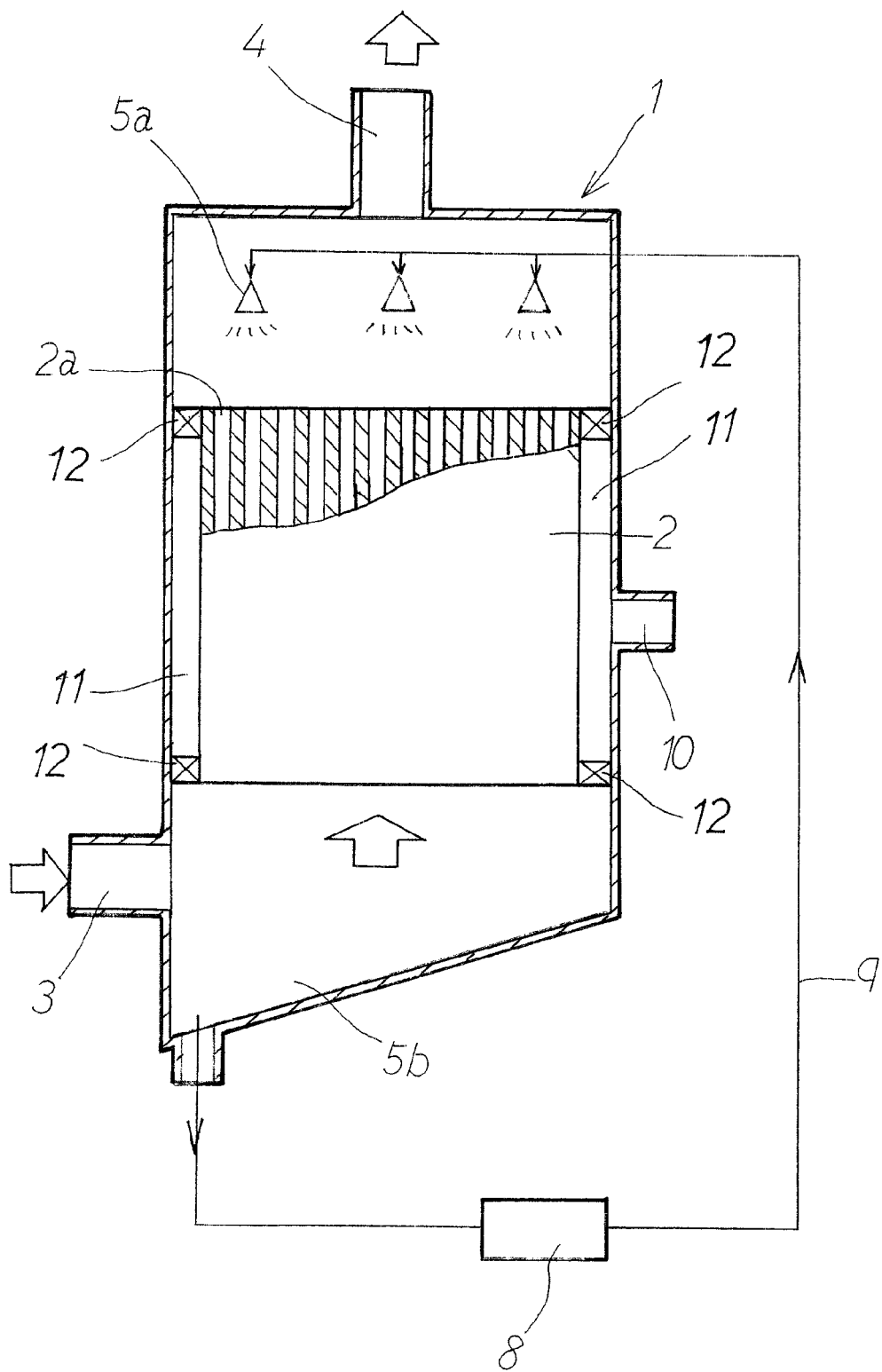
FIG. 1 is a schematic view of the gas collection apparatus of the present invention.

FIG. 1 is a schematic view of the embodiment of the gas collection apparatus of the present invention. This apparatus seeks to collect effectively specific gases such as carbon dioxide, nitrous oxide and methane from exhaust gas containing a plurality of gases emitted from, for example, an incinerator, power plant, particularly $CO_2$ gas.

In FIG. 1, reference numeral 1 denotes a hollow recovery apparatus main body supplied with pressurized gas to be processed and reference numeral 2 denotes a porous body that is installed within the recovery apparatus main body 1 and which is provided to enable specific gases within the gas to be processed to pass selectively. The porous body 2 is made of an inorganic substance such as a ceramic or zeolite, and although its configuration may be either in the shape of a sheet or cylindrical, the configuration shown in the FIG. 1 is of a monolithic type in which a plurality of through holes 2a provided within a cylindrical porous ceramic body. This monolithic type of porous body 2 is installed within the recovery apparatus 1 with upper and lower outer peripheries sealed with packing 12. The inside of the through hole 2a is the higher pressure side, because the pressurized gas to be processed is supplied to the inside of the porous body 2 while the outer peripheral portions, sandwiched by the packings 12, are located on lower pressure side 11. Reference numeral 3 denotes a supply port of gas to be processed, a supply port provided on the bottom portion of the recovery apparatus 1. Reference numeral 4 denotes a discharge port provided on the top of the recovery apparatus 1.

Figure 2:
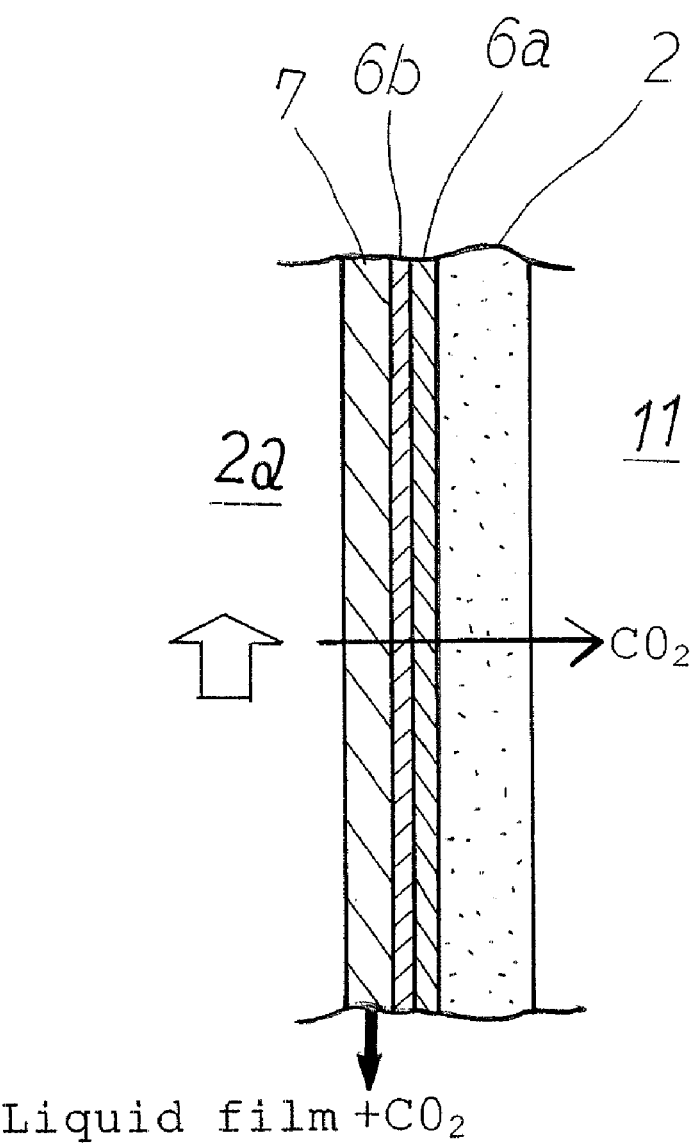
FIG. 2 is an enlarged sectional view of the surface structure of a porous body.

As shown in FIG. 2, a hydrophobic layer 6a and a hydrophilic layer 6b are formed on the inside surface of the porous body (on the side of the flow passage of the pressurized gas to be processed). As the hydrophobic layer 6a, a hydrophobic ceramic such as for example, nitride or carbide may be used, and as the hydrophilic layer 6b, a hydrophilic ceramic of oxide such as alumina, titania, zirconia may be used.

At the top portion of the porous body 2a Supply means 5a of an ionic liquid is provided for forming an ionic liquid film 7 on the surface of the porous body 2. As shown in FIG. 2, ionic liquid supplied from the top of the porous body 2 moves downward while forming a liquid film on the surface of the porous body 2, so as to absorb selectively a specific gas within gas to be processed. Reference numeral 11 denotes a low pressure portion formed on the outer periphery of the porous body 2 and reference numeral 10 denotes a $CO_2$ collection portion separated from the low pressure portion 11 by the liquid film 7.

The ionic liquid used in the present invention is a liquid called an ambient temperature molten salt, which is a solvent that is different from water or organic solvents. The ionic liquid exists in the form of a liquid in a range of 10-100° C. which is the ambient temperature, and the vapor pressure of the liquid is zero. The ionic liquid has a capacity of selective absorption on a gas/liquid contact face and in a dissolved state that is capable of absorbing only a specific gas.

As such for the ionic liquid, salts such as imidazolium salt, and pyridinium salt, pyrimidinium salt may be used. For example, an imidazolium salt expressed by the chemical formula described below can display a selective absorption performance on $CO_2$ because its anion ($PF_6$—) component is close to $CO_2$. If an ionic liquid close to a specific gas whose anion component is nitrous oxide, methane or the like is selected, only that gas can be absorbed selectively from the gas to be processed, and thus only that specific gas can be separated from the gas to be processed containing plural gases. In the meantime, U.S. Pat. No. 6,579,343 has described ionic liquids which can be used and which have a selective absorption capacity of $CO_2$.

Chemical formula for imidazolium

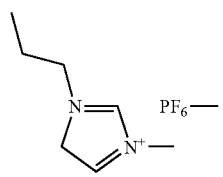

The present invention directs attention to the selective gas absorption capacity possessed by an ionic liquid and uses the ionic liquid as a medium for separating a specific gas. For example, because an imidazolium salt can secure a degree of dissolution that is about 100 times that of water, an imidazolium salt can enable $CO_2$ with a molar ratio of 0.2 to be dissolved physically when it is brought into contact with $CO_2$ at 10 atm. Thus, a large amount of $CO_2$ can be absorbed by a small amount of imidazolium salt. Although, because conventional gas absorption with an amine solution or the like depends on chemical dissolution, a large amount of heating energy is required for heating and releasing gas that has been absorbed, because an ionic liquid executes dissolution physically, an ionic liquid can enable absorbed gas to be released only for example by releasing the pressure, and loss of energy is negligible.

According to the present invention, by moving ionic liquid that has a selective absorption capacity of a specific gas along the surface of the porous body 2 that has the hydrophobic layer 6a and the hydrophilic layer 6b, a liquid film 7 is formed and the specific gas in the gas to be processed is absorbed into the liquid film 7 by the selective absorption capacity of the ionic liquid by bringing the pressurized gas to be processed into contact with this liquid film 7.

Next, the specific gas that has been absorbed into the liquid film 7 is induced to pass through the porous body 2 by the use of a difference in pressure between the higher pressure side, in which pressurized gas to be processed flows to maintain a high pressure, and the lower pressure side, which is separated by the liquid film 7 and the porous body 2, and collection by the collection portion 10.

In contrast, after the liquid film 7 finishes moving along the surface of the porous body 2, it is collected by a collection portion 5b on the bottom portion and by releasing the pressure to release and collect the specific gas the liquid thus collected is separated into the gas and liquid by a separator 8. The ionic liquid thus collected is then circulated through a feedback passage 9 so as to be used for the formation of the liquid film 7 again.

According to the present invention, by means of a combination of the liquid film separation method and the physical absorption method, a specific gas can be collected effectively in high concentrations. In these circumstances, because the liquid film 7, is formed in such a way that it moves along the surface of the porous body 2, and is flowing, it always provides a fresh film condition and is able to separate the specific gases effectively. Further, any foreign matter, such as dust and dirt present in the gas to be processed never adheres to or is deposited on pores of the porous body 2 because it continuously flows out, and as such, stable liquid film separation processing can be secured over a long period of time.

With regard to the provision on the surface of the porous body 2 of the hydrophobic layer 6a and the hydrophilic layer 6b, a uniformly thin liquid film can be formed because the side of the surface that makes contact with the liquid film 7 has hydrophilic properties and the side that makes contact with the porous body 2 blocks the ionic liquid that forms the liquid film 7 from passing through the porous body 2 because it demonstrates hydrophobic properties.

In the example illustrated in the drawings, gas to be processed is an upward flow which flows upwards within the porous body 2. In contrast, the ionic liquid is supplied from the supply portions 5a located on the top portion and as it forms the liquid film on the surface of the porous body 2 becomes a downward flow which moves downward by the force of gravity. However, the movement of the ionic liquid along the surface of the porous body can also be achieved by blowing the liquid upwards by a means of the gas to be processed.

The present invention enables a large amount of gas to be processed with only a small amount of ionic liquid because the liquid film 7 is formed by constantly circulating the ionic liquid, thereby leading to a reduction in running costs.

As evident from the above description, the present invention uses a combination of the liquid film separation method and the physical absorption method, according to which the liquid film is formed on the surface of the porous body by moving ionic liquid thereon having a selective absorption capacity of specific gas, and the specific gas in the gas to be processed is absorbed into the liquid film by bringing the pressurized gas to be processed into contact with the liquid film. After that, the specific gas that has been absorbed into the liquid film is passed through the porous body by use of the difference in pressure and collected, accordingly, after the liquid film finishes moving along the surface of the porous body, it is also collected. The specific gas is then released from this collecting liquid and collected. As a result, specific gas can be collected effectively in high concentrations and loss of energy can be limited to a modest level. Further, clogging of the porous body can be prevented and stable liquid film separation processing can be secured. A further advantage is that recovery processing is carried out at a low cost because only a modest amount of ionic liquid needs to be used and recovered.

EXAMPLE

Figure 3:
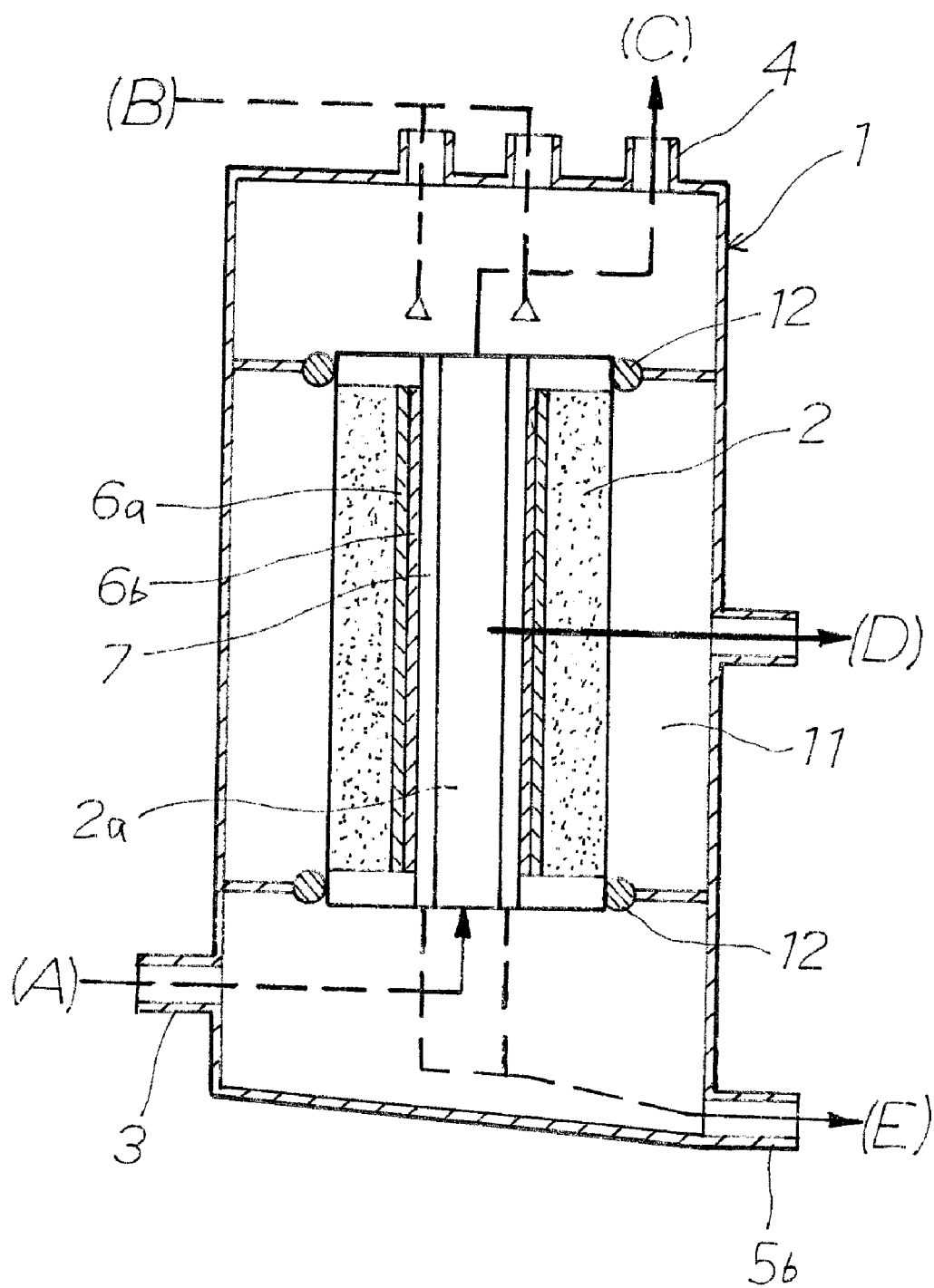
FIG. 3 is a schematic view of the gas collection apparatus used in the embodiment.

With use of the gas collection apparatus shown in FIG. 3, $CO_2$ gas was collected as gas to be processed from exhaust gas of a kind that simulated exhaust gas from a power plant ($CO_2$ concentration was 15 vol%). Because the configuration of the apparatus is the same as the apparatus shown in FIG. 1, except insofar that a ceramic tube was used as the porous body 2, identical reference numerals have been attached to corresponding portions. In Table 1 are listed factors such as processing temperatures, pressures, materials and sizes of porous bodies, kind of ionic liquid. Table 1 also sets out recommendations relating to the various conditions listed.

TABLE 1

| Item | Recommended | Example |
| --- | --- | --- |
| Temperature | 0-80° C. | 40° C. |
| Pressure (high pressure side) | 0.1-10 MPa | 2 MPa |
| Pressure (low pressure side) | Lower than high pressure side | 0.1 MPa |
| Type of ionic Liquid | Imidazolium salt | 1-butyl 3-methyl imidazolium hexafluorophosphate |
| Hydrophilic ceramic | Oxide (alumina, titania, zirconia) | TiO2 is main component |
| Hydrophobic ceramic | Nitride, carbide | SiC is main component |
| Pore diameter of ceramic | Preferable if ionic liquid can be maintained | 0.1 μm |
| Thickness of ionic liquid film | As thin as possible | 1 mm |
| Apparatus size | | Ceramic tube within an inner diameter of 5 mm and 150 mm in length |
| Flow rate of ionic liquid | | 0.3 L/minute |

The concentrations of exhaust gas in (A)-(E) in the Figure were as follows.

(A) gas to be processed: temperature: 40° C., flow rate: 5.0 L/min $CO_2$: 0.75 L/min, $N_2$: 4.25 L/min (B) ionic liquid: flow rate: 0.8 mol/min (0.3 L/min)

(C) exhaust gas: $CO_2$, 0.14 L/min, $N_2$: 4.25 L/min $CO_2$ collection rate: 81.1%

(D) collected gas (1): $CO_2$: 0.2 L/min, $N_2$: 4.1 E-03 L/min $CO_2$ concentration: 99.0%

(E) collected gas (2): 0.2 L/min, $N_2$: 0.0004 L/min $CO_2$ concentration: 99.8%

(collected by reducing to 0.1 MPa)

It was verified that although $N_2$ concentrations of gas to be processed (A) and exhaust gas (C) were both 4.25 L/min, the $CO_2$ concentration of the gas to be processed (A) was 0.75 L/min while that of the exhaust gas (C) was 0.14 L/min and that $N_2$ gas was not absorbed but only $CO_2$ gas selectively absorbed. As for the $CO_2$ gas, it was verified that this gas could be collected effectively in high concentrations with the $CO_2$ gas concentration collected by the liquid film separation of the porous body at 0.41 L/min (see (D) collected gas (1)), and additionally by the physical absorption of the gas at 0.2 L/min (see (E) collected gas (2)).

The invention claimed is:

1. A gas collection method for separating and collecting a specific gas from gas to be processed containing plural kinds of gases, wherein a liquid film is formed on a surface of a porous body in which a hydrophobic layer and a hydrophilic layer are formed, by moving on the surface of the porous body an ionic liquid having a selective absorption capacity of specific gas; the specific gas in the gas to be processed is absorbed into the liquid film by bringing pressurized gas to be processed into contact with the liquid film; the specific gas absorbed into the liquid film is passed through the porous body by use of a difference in pressure and collected on a low pressure side; and after the liquid film has finished moving along the surface of the porous body it is collected and the specific gas contained in the liquid that has been collected is released.

2. The gas collection method according to claim 1 wherein the ionic liquid obtained by releasing the specific gas from the liquid that has been collected is circulated so as to form a liquid film once again.

3. The gas collection method according to claim 1 wherein as the hydrophobic layer and the hydrophilic layer, a side making contact with the liquid film indicates a hydrophilic property and a side making contact with the porous body indicates a hydrophobic property.

4. The gas collection method according to claim 1 wherein the specific gas is $CO_2$ gas.

5. The gas collection method according to claim 1 wherein the ionic liquid is an imidazolium salt.

* * * * *

UNITED STATES PATENT AND TRADEMARK OFFICE
CERTIFICATE OF CORRECTION

PATENT NO. : 7,828,880 B2
APPLICATION NO. : 11/538191
DATED : November 9, 2010
INVENTOR(S) : Yusuke Moriya, Toichiro Sasaki and Tetsuya Yanase It is certified that error appears in the above-identified patent and that said Letters Patent is hereby corrected as shown below:

Column 3
  *Line 16*: add a space between "2" and "a"

Signed and Sealed this
First Day of February, 2011

David J. Kappos
*Director of the United States Patent and Trademark Office*